US009127983B1

(12) United States Patent
Cox et al.

(10) Patent No.: US 9,127,983 B1
(45) Date of Patent: Sep. 8, 2015

(54) SYSTEMS AND METHODS FOR CONTROLLING AN OPERATING WAVELENGTH (71) Applicant: Sandia Corporation, Albuquerque, NM (US)

(72) Inventors: Jonathan Albert Cox, Albuquerque, NM (US); Anthony L. Lentine, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 369 days.

(21) Appl. No.: 13/871,887

(22) Filed: Apr. 26, 2013

(51) Int. Cl.
*G01J 5/08* (2006.01)
*G01J 1/16* (2006.01)

(52) U.S. Cl.
CPC .......................................... *G01J 1/16* (2013.01)

(58) Field of Classification Search
CPC ................. G01J 1/16; G01J 1/04; G01J 5/08
USPC ........ 250/227.21, 205, 226; 398/158; 372/20; 385/140
See application file for complete search history.

(56) References Cited

U.S. PATENT DOCUMENTS

| 5,109,462 | A * | 4/1992 | Watanabe et al. ............. 359/328 |
| 5,272,334 | A * | 12/1993 | Sai ............................ 250/227.21 |
| 6,680,472 | B1 * | 1/2004 | Thingbø et al. ........... 250/227.12 |
| 6,744,793 | B2 * | 6/2004 | Stoner et al. ..................... 372/32 |
| 2002/0191243 | A1 * | 12/2002 | Stoner et al. .................. 359/110 |

OTHER PUBLICATIONS

Cox, et al., Pulse synthesis in the single-cycle regime from independent mode-locked lasers using attosecond-precision feedback, Op. Express, V. 37, No. 17, p. 3579, Aug. 2012.
Heurs, et al., Homodyne locking of a squeezer, Optics Letters, V. 34, No. 16, p. 2465, Aug. 2009.
Lipson, Compact Electro-Optic Modulators on a Silicon Chip, IEEE Journal of Selected Topics in Quantum Electronics, V.12, No. 6, pp. 1520-1526, Nov. 2006.
Lira, et al., Broadband hitless silicon electro-optic switch for on-chip optical networks,Optics Express, V. 17, No. 25, p. 22271, Nov. 2009.
Padmaraju, et al., Thermal stabilization of a microring modulator using feedback control, Optics Express, V.20, No. 27, p. 27999, Dec. 2012.
Popovic, et al., Hitless-Reconfigurable and Bandwidth-Scalable Silicon Photonic Circuits for Telecom and Interconnect Applications, Optical Fiber Communications, 2008, OTuF4.
Qiu, et al., Wavelength tracking with thermally controlled silicon resonators, Optics Express, V. 19, No. 6, p. 5143, Mar. 2011.
Watts, Adiabatic microring resonators, Optics Letters, V. 35, No. 19, p. 3231, Sep. 2010.
Watts, et al.,Vertical Junction silicon microdisk modulators and switches, Optics Express, V. 19, No. 22, Oct. 2011.
Xu et al., Micrometre-scale silicon electro-optic modulator, Nature, V. 435, No. 19, p. 325-327, May 2005.
Zortman et al., Active wavelength control of silicon microphotonic resonant modulators, IEEE Micro, pp. 1-1, 2012.

* cited by examiner

*Primary Examiner* — Seung C Sohn
(74) *Attorney, Agent, or Firm* — Martin I. Finston (57) ABSTRACT

The resonant frequency of an optical micro-resonator may be controlled by "locking" an operating frequency/wavelength of the resonator using CMOS compatible electronic components.

29 Claims, 4 Drawing Sheets

SYSTEMS AND METHODS FOR CONTROLLING AN OPERATING WAVELENGTH

GOVERNMENT LICENSE RIGHTS

This invention was developed under Contract DE-AC04-94AL85000 between Sandia Corporation and the U.S. Department of Energy. The U.S. Government has certain rights in this invention.

BACKGROUND

Silicon photonic micro-resonators have demonstrated great promise as compact optical modulators and filters for high-speed and low power wavelength division multiplexing (WDM) interconnects on integrated circuits (IC), for example. However, as sensitive resonant devices, the operating wavelength of the micro-resonator exhibits unpredictable fluctuations due to environmental perturbations, including temperature variations, optical noise and unavoidable manufacturing imperfections. Even single nanometer scale variations can lead to a frequency shift larger than the optical bandwidth of the resonator. Because the resonator is by its nature a narrow band, resonant device, precise wavelength control is necessary to "lock" the resonator onto a desired optical communications wavelength (by convention, the locked wavelength is referred to as a "resonant frequency"). As such, an active control system is typically required for wavelength stabilization to an optical data carrier, and to enable such functionality as switching and routing. To be viable for IC mass production, a desirable control system faces many technical challenges. For example, a satisfactory control system should be readily integrated, low power, compact, tolerant of optical power fluctuations and avoid reliance upon calibration or arbitrarily selected, locking references. Furthermore, compatibility with both filters and modulators is usually desirable. Yet further, a control system should be capable of operating in the presence of multiple data carriers in a WDM network, and be able to maintain a operating wavelength (i.e., resonant frequency) when the optical data channel is in an idle state. To date, the inventor is unaware of a solution to such technical challenges.

SUMMARY

To address the technical challenges discussed above the inventor has discovered methods and related systems for controlling an operating wavelength. In one embodiment, a system may be used to actively control the resonant frequency of optical modulators and filters, for example. Such a system may rely on balanced homodyne phase detection (BHD) of an optical carrier to generate a corrective or comparison signal (which may be referred to as an "error" signal by those skilled in the art) that is impervious to optical noise and does not require complex electronics or an arbitrary locking reference. The inventor discovered that at the micron scale of silicon photonics such a BHD-based method may provide nearly perfect common mode noise rejection.

According to an embodiment of the invention, a system for controlling an operating wavelength may comprise a first waveguide, having a first optical path length, configured to transport a portion of an optical signal, a second waveguide, having a second optical path length, configured to transport a perturbed portion of the optical signal, a multi-port, optical directional coupler operable to receive the signals from the first and second waveguides, combine the received signals and output combined signals, and a balanced, photodetection section operable to receive the combined signals and output a comparison signal for adjusting an operating wavelength of the optical signal. The system may further comprise an optical micro-resonator operable to generate the perturbed portion of the optical signal.

In an embodiment of the invention the system may comprise a filter, such as a pass band filter for example.

In an alternative embodiment of the invention the system may additionally comprise a modulator operable to modulate the optical micro-resonator. When the system includes such a modulator the system may substantially operate as a modulator.

In embodiments of the invention the micro-resonator may comprise one or more circular or ovoid resonators, the directional coupler may comprise a 50%, four-port semiconductor (e.g., silicon-based) directional coupler, the first and second waveguides may comprise semiconductor (e.g., silicon-based) or dielectric waveguides, and the photodetection section may comprise Germanium-based photodiodes, for example.

In addition to the components just described, the system may further comprise a feedback section operable to receive a comparison signal and output a tuning signal for (i) adjusting a frequency associated with an optical micro-resonator to substantially equal a desired resonant frequency (filter operation), or, alternatively, (ii) adjusting a frequency associated with an optical micro-resonator to approximate a desired resonant frequency (modulator operation). In an additional embodiment of the invention the system may comprise metalized silicon or metal film leads that are configured to transport the tuning signal to the micro-resonator to thermally adjust a frequency of the micro-resonator to control, maintain or establish (collectively referred to as "control" unless the context indicates otherwise) a resonant frequency, for example.

A system according to an embodiment of the invention may optionally comprise a phase shifter (e.g., semiconductor phase shifter) operable to adjust at least one of the optical path lengths of the first and/or second waveguides to form substantially equal, first and second optical path lengths, and an additional directional coupler operable to couple a portion of the input optical signal to the first waveguide. In an embodiment of the invention, the additional directional coupler may be further operable to couple less than 10% of the optical power of the optical signal to the first waveguide.

In addition to the systems described above, embodiments of the invention include methods for controlling an operating wavelength. For example, one method may comprise transporting a portion of an optical signal over a first waveguide, having a first optical path length; transporting a perturbed portion of the optical signal over a second waveguide, having a second optical path length, receiving the signals from the first and second waveguides at a multi-port, optical directional coupler, combining the received signals, outputting the combined signals, and receiving the signals output from the directional coupler at a balanced, photodetection section and outputting a comparison signal for adjusting an operating wavelength of the optical signal. In one embodiment of the invention, the method may couple less than 10% of the optical power of the input optical signal to the first waveguide.

The methods described herein may be applied to a semiconductor filter or modulator. When applied to a modulator, the method may further comprise modulating an optical micro-resonator.

In addition, such a method may additionally comprise generating the perturbed portion of the optical signal using an optical micro-resonator, receiving the comparison signal and outputting a tuning signal for (i) adjusting a frequency associated with the optical micro-resonator to substantially equal a desired resonant frequency (filter operation), or, alternatively (ii) receiving the comparison signal and outputting a tuning signal for adjusting a frequency associated with the optical micro-resonator to approximate a desired resonant frequency (modulator operation). Still further, the method may comprise transporting the tuning signal to the micro-resonator to thermally adjust a frequency of the micro-resonator to control a resonant frequency, for example.

In addition to the method(s) described above, alternative methods may include the additional process of adjusting at least one of the optical path lengths, of the first and second waveguides, to form substantially equal, first and second optical path lengths.

Additional embodiments of the invention will be apparent from the following detailed description and appended drawings.

DETAILED DESCRIPTION, INCLUDING EXAMPLES

Exemplary embodiments of systems and methods for controlling an operating wavelength are described herein in detail and shown by way of example in the drawings. Throughout the following description and drawings, like reference numbers/characters refer to like elements. As used herein the phrase "resonant frequency" and "operating wavelength" may be used interchangeably and synonymously unless otherwise noted or as can be readily discerned from the context of a given statement. The inventor notes that, as is known in the art, a particular wavelength is inversely proportional to a particular frequency, such that the identification of a wavelength necessarily identifies a frequency and vice-versa. Thus, while the present invention concerns optical devices and associated wavelengths, nonetheless, the phrase "resonant frequency" will be used instead of resonant wavelength because the former is the accepted phrase used by those skilled in the art.

It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

It should be noted that some exemplary embodiments may be described as processes or methods depicted in a flow diagram. Although the flow diagram may describe the processes/methods as sequential, the processes/methods may be performed in parallel, concurrently or simultaneously. In addition, the order of each step within a process/method may be re-arranged. A process/method may be terminated when completed, and may also include additional steps not included in the flow diagram. The processes/methods may correspond to functions, procedures, subroutines, subprograms, etc., completed by a physical component.

It should be understood that, although the terms first, second, etc., may be used herein to describe various components, these components should not be limited by these terms. Instead, these terms are used to merely distinguish one component from another. For example, a first waveguide could be termed a second waveguide, or vice-versa, without departing from the scope of the disclosed embodiments. As used herein, the term "and/or" includes any and all combinations of one or more of the associated listed items. It should be understood that if a component is referred to, or depicted, as being "connected" to another component it may be directly connected to the other component or intervening components may be present, unless otherwise specified. As used herein, the singular forms "a," "an" and "the" are not intended to include the plural form unless the context clearly indicates otherwise.

Unless specifically stated otherwise, or as is apparent from the discussion, the term "determining" refers to the action and processes of a computing system, such as a hardware controller or processor, or similar electronic computing device, that executes instructions stored in associated memory (e.g., programs) in order to complete features and functions of the present invention. Such functions may include the manipulation and transformation of data represented as physical, electronic quantities within the computing system's registers and memories, for example, into other data similarly represented as physical quantities within the computing system's memories or registers or other such information storage, transmission or display devices. Relatedly, the terms "controller", "processor" and "control system" include an electronic hardware device, such as a microprocessor, that accesses and executes instructions stored in associated memory to complete stated functions, features or processes. The phrases "transport" or "transporting" mean transmitting, sending or forwarding a signal or signals or some portion of such a signal or signals. Yet further the phrase "operable to" means at least having the capability of operating to complete, and/or is operating to complete, specified features, functions, process steps, or having the capability to meet desired characteristics, or meeting desired characteristics.

As used herein, the term "embodiment" refers to an example of the present invention.

Figure 1:
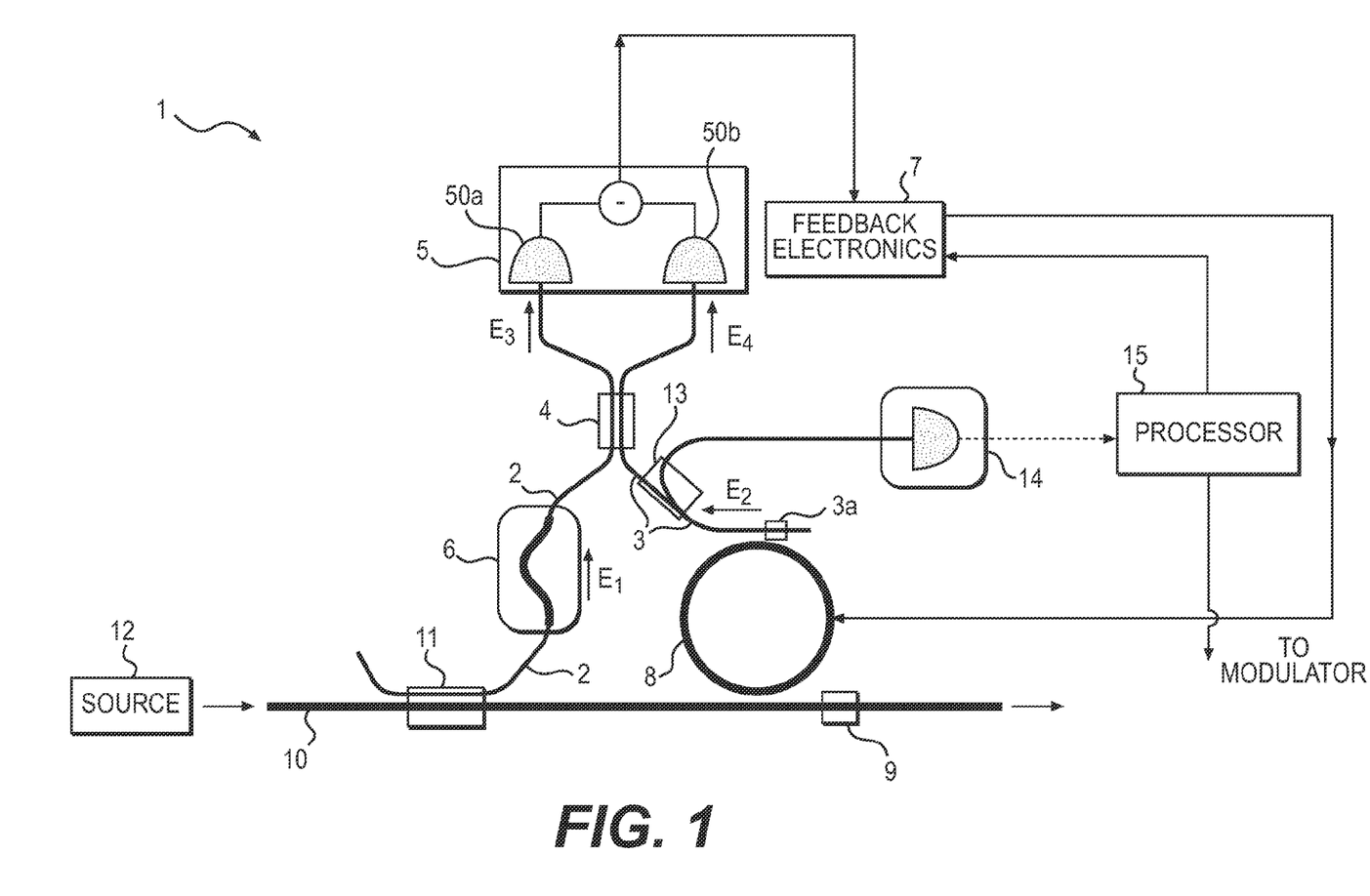
FIG. 1 depicts a functional block diagram of a system according to an embodiment of the invention.

FIG. 1 depicts a functional block diagram of a system 1 according to an embodiment of the invention.

System 1 may be operable to receive an input optical signal being transported through a source optical waveguide 10. The optical signal may originate from any number of different types of sources 12, such as a tunable laser for example. The system 1 may include a first waveguide 2, having a first optical path length, configured to transport a coupled portion of the input optical signal. The remainder (typically 90% or more) of the optical signal may be fed to a semiconductor-based, optical, integrated micro-resonator 8 ("micro-resonator" for short). The system 1 may further include a second waveguide 3, having a second optical path length, configured to transport a second, perturbed portion of the optical signal. In one embodiment of the invention the first and second waveguides 2,3 may comprise semiconductor (e.g., silicon-based) or dielectric waveguides though other materials may be used to form the waveguides. In an embodiment of the invention, the portion of the optical signal not coupled to the first waveguide 2, but fed to the micro-resonator 8 may be perturbed by the micro-resonator 8 and then coupled to the second waveguide 3 via a so-called "drop" port 3a. To couple the portion of the input optical signal to the first waveguide 2 the system 1 may further comprise a first optical directional coupler 11. In an embodiment of the invention the first directional coupler 11 may be further operable to couple less than 10% of the optical power of the input optical signal to the first waveguide 2. For example, 2 to 3% of the optical power may be coupled to the first waveguide 2.

As is known in the art, when the micro-resonator 8 is operating at its resonant frequency most of the light is transferred to the drop port 3a. Thus, little or none of the input optical signal will be coupled to the output, through port 9 and its associated waveguide. Conversely, when the micro-resonator 8 is operating far from its resonant frequency the majority of the optical signal input into the micro-resonator 8 will pass through and be output via the through port 9 and its associated waveguide. However, when the micro-resonator 8 is operating at a frequency that is near to, but not at, its resonant frequency some of the optical signal input into the micro-resonator 8 will be output and coupled to the second waveguide 3.

The optical signal that is output via the drop port 3a has been perturbed by the micro-resonator 8, and thus may be referred to as a "perturbed portion". In accordance with the present invention, the inventor discovered methods and related systems to utilize this perturbation effect to lock the micro-resonator 8 to a desired resonant frequency, as described herein.

In accordance with an embodiment of the invention the micro-resonator 8 may be operable to encode an optical carrier wave in the optical signal in amplitude or phase by acting upon the optical field inside the micro-resonator 8. In embodiments of the invention, the micro-resonator 8 may comprise one or more circular or ovoid resonators. If circular resonators are used, they may be first-order (i.e., single-ring resonators) or second-order resonators (i.e., two coupled rings). By "ovoid resonators" is meant resonators shaped substantially as ellipses or ovals. It should be noted that resonator structures and designs other than circular or ovoid may also be used.

In an embodiment of the invention, the first directional coupler 11 and micro-resonator 8 may be configured to couple or output, respectively, similar amounts of optical power to their associated waveguides 2,3. By similar is meant within an order of magnitude (e.g., 1 µW and 10 µW, respectively). It should be noted, however, that in alternative embodiments of the invention, different optical power amounts may be coupled to the waveguides 2,3, although somewhat reduced sensitivity may result. In particular, it should be noted that when the micro-resonator 8 is operating at its resonant frequency, the performance and function of the system 1 may be acceptable even when the respective optical powers coupled to the waveguides 2,3 are substantially unequal.

Continuing, the system 1 may include a multi-port, optical directional coupler 4 (sometimes referred to as the "second coupler" to distinguish it from the first coupler 11) that may be operable to receive signals from the first and second waveguides 2,3. Regarding the second waveguide 3, the second coupler 4 may be operable to receive a perturbed portion of the optical signal from the micro-resonator 8 via the second waveguide 3. Upon receiving the signals from waveguides 2,3 the coupler 4 may be operable to combine the received signals and output the combined signals to a balanced, photodetection section 5. For example, given input light E1 and E2, the coupler 4 may be operable to produce combined output signals E3 and E4. In one embodiment of the invention the coupler 4 may be configured as a 50% (~3 dB), four port, semiconductor (e.g., silicon-based) directional coupler (i.e., the integrated analog of a free space optical beam splitter with 50% transmission and reflection at an operating wavelength) that is operable to combine the portions of the optical signal transported by the first and second waveguides 2,3. In an embodiment of the invention, the coupling ratio of the coupler 4 should be as close as possible to 50% in order to output signals associated with a desired transfer function.

The system 1 may additionally include the balanced photodetection section 5 that may be operable to receive the combined signals from the second coupler 4 and output a corrective or comparison signal to a feedback section 7 in order to ultimately adjust an operating wavelength (i.e., resonant frequency) of the micro-resonator 8 (the comparison signal may be referred to as an "error" signal by those skilled in the art). In an embodiment of the invention, the photodetection section 5 may comprise a pair of integrated photodetectors 50a, 50b that may be operable to detect interference of the signals output from each output port of the multi-port directional coupler 4 (also referred to as a process of "beating" or "mixing" by those skilled in the art). In more detail, the photodetectors 50a, 50b may be configured in a balanced, subtracting configuration to provide a zero voltage crossing signal that is insensitive to amplitude noise. The balanced photodetection section 5 may be operable to detect the intensity (magnitude squared) of the electric field, as a result of optical interference from the output of the directional coupler 4 which may vary based on optical interference between waves combined by the directional coupler 4. In an embodiment of the invention, the photodetection section 5 may be operable to output a comparison signal that is proportional to the difference in photocurrent between photodetectors 50a, 50b. That is, as the detected intensity varies, so to will the comparison signal. For this reason the comparison signal may be referred to as a variable, comparison signal. In an embodiment of the invention, the integrated photodetectors 50a, 50b may comprise an array of Germanium-based photodiodes, for example. Together, the photodetection section 5, directional coupler 4, optional phase shifter 6 (discussed below), and waveguides 2,3 may comprise a BHD system in accordance with one embodiment of the invention.

As indicated above, the photodetection section 5 may be operable to output a variable comparison signal to the feedback section 7. Thus, in a further embodiment of the invention the system 1 may include the feedback section 7. The feedback section 7 may be operable to receive the variable comparison signal and use the signal to adjust, if need be, the operation of the micro-resonator 8 in order to maintain a stable resonant frequency, for example. In accordance with an embodiment of the invention, in response to receipt of the variable comparison signal the feedback section 7 may be operable to output a variable adjustment or "tuning" signal to the micro-resonator 8 in order to adjust a frequency (or equivalently, a wavelength) associated with the micro-resonator 8.

In an embodiment of the invention the feedback section 7 may, for example, comprise an operational amplifier operable to receive the variable comparison signal from the photodetection section 5. In response to the receipt of the variable comparison signal the operational amplifier may output a variable tuning signal. The tuning signal may comprise a variable amount of electrical current suitable to heat a portion of the micro-resonator 8 in order to adjust its resonant frequency, for example. Alternatively, the feedback section 7 may comprise a digital electronic control system consisting of all of the necessary electronics for receiving variable comparison signals from the photodetection section 5 and outputting signals to tune or otherwise adjust the resonant frequency of the micro-resonator 8. Alternatively, the feedback section 7 may comprise an application specific integrated circuit (ASIC).

In an embodiment of the invention the overall system 1 may be 10 to 20 microns or more in diameter, for example, while the micro-resonator 8 may be 3 to 6 microns in diameter or more, for example. Further, the photodetection section 5 and feedback section 7 may comprise CMOS compatible electronic structures (e.g., Germanium).

The system 1 may further comprise an optional semiconductor phase shifter 6. In an embodiment of the invention, once the portion of the input signal is coupled to the first waveguide 2 it may be fed to the phase shifter 6 where the phase of the signal may, or may not be, adjusted. The phase shifter 6 may be operable to adjust at least one of the first or second optical path lengths of the first or second waveguides 2,3, respectively, to form substantially equal (modulo 2π radians), first and second optical path lengths. In the embodiment depicted in FIG. 1, the phase shifter 6 is depicted connected to the first waveguide 2. Thus, the phase shifter 6 may be operable to adjust the optical length of the first waveguide 2. In alternative embodiments the phase shifter 6 may be connected to the second waveguide 3 or both waveguides. The phase shifter 6 may comprise a static (low speed) phase shifter to adjust the optical path length between the input and output waveguides. This phase shifter 6 may further provide post-manufacturing adjustment/trimming capability. That is, if it is determined after the system 1 is manufactured, or made part of a manufactured device, that the optical path of one of the waveguides 2,3 needs to be adjusted the phase shifter 6 may be accessed and controlled by an electronic system (not shown in FIG. 1), such as a programmable, analog integrating filter or digital integrating filter that includes an analog to digital converter, for example. The electronic system may be operable to output a variable voltage in order to complete the adjustments. The phase shifter 6 may also comprise a CMOS compatible electronic structure (e.g., Germanium).

Upon exiting the shifter 6 the signal may be fed to the second coupler 4 where it may be combined with a signal from the second waveguide 3 as described herein.

In the embodiment depicted in FIG. 1, the system 1 is configured to operate as a filter that separates out a particular pass band so that data alone can be re-routed or demodulated, for example. It should be understood that this is just one of the many types of systems that may make use of the present invention. For example, the system 1 may be configured to operate as a modulator. In such a case the optical signal passing through the micro-resonator 8 may have its phase or amplitude modulated via an electrical signal (see FIG. 2), or any other control signal that rapidly shifts the resonant frequency of the micro-resonator 8. In an embodiment of the invention, the resonant frequency may be modulated by a modulator (not shown in FIG. 1) modulating a voltage or current stimulating or flowing through the micro-resonator 8.

In yet another embodiment, the system 1 may be configured to operate as a part of a WDM device or system. With this in mind we turn to a discussion of the optional Y-splitter 13, data receiver 14 and processor 15 shown in FIG. 1.

In an alternative embodiment, the light coupled to waveguide 3 may be fed to an optional Y-splitter 13 before entering the second coupler 4. To be clear, the Y-splitter and data receiver 14 are optional and in many cases may not be necessary.

For example, in the case where the system 1 comprises a high-speed modulator in a non-WDM system these components may be unnecessary. In an embodiment of the invention, high-speed electrical modulation of the micro-resonator 8, which is typically separate from the slow-speed, but wide band, tuning mechanism, makes use of current injection, accumulation charge, or depletion region modulation of an integrated PN diode junction or capacitor in the resonator itself.

In some configurations of the system 1, inclusion of the Y-splitter 13 and data receiver 14 may be advantageous. For example, in the case where the system 1 is configured to operate as a part of a WDM device or system the input optical signal most likely comprises multiple signals, each at a different wavelength. Thus, the portion of the signal that is coupled to the second waveguide 3 will also include one of the multiple signals. The challenge becomes locking the system 1, and in particular the micro-resonator 8 (whether operating as a modulator or a drop filter), to a correct resonant frequency despite the presence of multiple signals within the input optical signal. In an embodiment of the invention, a channel identifier code, such as a unique low-speed pattern, may be encoded onto each of the multiple signals by a source 12. In this way each signal (i.e., wavelength) may be encoded with a unique code. Thereafter, upon exiting the micro-resonator 8 the signal transported via the second waveguide 3 may be received by the Y-splitter 13. In an embodiment of the invention the signal received by the Y-splitter 13 includes one of the multiple signals and its respective code. The Y-splitter 13 may be operable to couple a portion (e.g., 10-90%) of the received signal to the data receiver 14, while allowing the remainder of the signal to pass through to the second coupler 4. The signal received by the data receiver 14 also contains a representation of the signal and its respective, unique code. In an embodiment of the invention the data receiver 14 may be operable to detect the code and forward the detected code on to the processor 15 (e.g., microprocessor). In an embodiment of the invention, the processor 15 may be operable to determine whether or not the detected code is associated with a desired optical channel (wavelength). In an embodiment of the invention, should the processor 15 determine that a received code is not associated with a desired optical channel, the processor 15 may be further operable to forward a signal to the feedback section 7 in order to instruct the feedback section 7 to output a tuning signal in order to adjust or tune the micro-resonator 8. In this manner the micro-resonator 8 may begin to operate at an adjusted wavelength or frequency. This adjusted wavelength or frequency may match another one of the multiple signals within the input optical signal. Such a signal may be associated with its own unique code. This signal is again output to the Y-splitter 13, data receiver 14 and processor 15 in order to compare the received code with a desired code. In an embodiment of the invention, this process may continue until the code associated with a desired signal (as identified, e.g., by a particular wavelength channel) is detected by the processor 15 (i.e., until a resonant frequency is detected).

The description above presumed the system 1 was operating as a filter. In yet another embodiment of the invention the system 1 may operate as a modulator. If so, the processor 15 may be operable to output a modulator tuning signal, and feed the signal to the micro-resonator 800 in order to adjust a modulation frequency output by a modulator to approximate a desired resonant frequency (i.e., set a frequency which may be slightly detuned from perfect resonance).

The description above illustrates ways in which the signal output via drop port 3a, and a single Y-splitter 13 may be further utilized to control a filter or modulator. In should be understood that additional embodiments of the invention may make use of such a signal in conjunction with additional or modified splitters. For example, in an embodiment of the invention the signal output from the drop port 3a may be transported to another optical device (e.g., router; not shown in FIG. 1). In such an embodiment the system 1 may comprise a three way splitter (not shown in FIG. 1 for the sake of clarity). Thus, the signal being transported by waveguide 3 may be split such that a first portion of the signal may be transported to the directional coupler 4, a second portion may be transported to the receiver 14, while a third portion may be transported to an additional optical waveguide and then on to another optical or electronic device (again, not shown in FIG. 1). Alternatively, instead of using a three-way splitter, in another embodiment the system 1 may include an additional two-way Y-splitter that is connected to the waveguide 3 after drop port 3a that is operable to split or otherwise transport a portion of the signal on waveguide 3 to an additional waveguide/device. Still further, yet a third directional coupler may be connected after this additional splitter in order to sample the power of the signal exiting the additional splitter.

In an embodiment of the invention, the system 1 may be configured to operate as a drop filter. In such an embodiment the signal being transported via waveguide 3 may be split three ways; a portion being transported to the directional coupler 4, a portion being transmitted or otherwise transported to the receiver 14, and the remainder being transported elsewhere as a pass band filter output, for example. Alternatively, if the system 1 is configured as a modulator, the signal being transported by waveguide 3 may be split once (as described previously) or, alternatively, may be split into three branches or paths.

Many of the components of the system 1 may be configured on a single, miniature electronic device referred to as a "chip". Alternatively, some of the components, such as the photodetectors 50a, 50b and feedback section 7 may be configured as separate elements (configured as "off" chip components) that are connected to "on" chip components.

Figure 2:
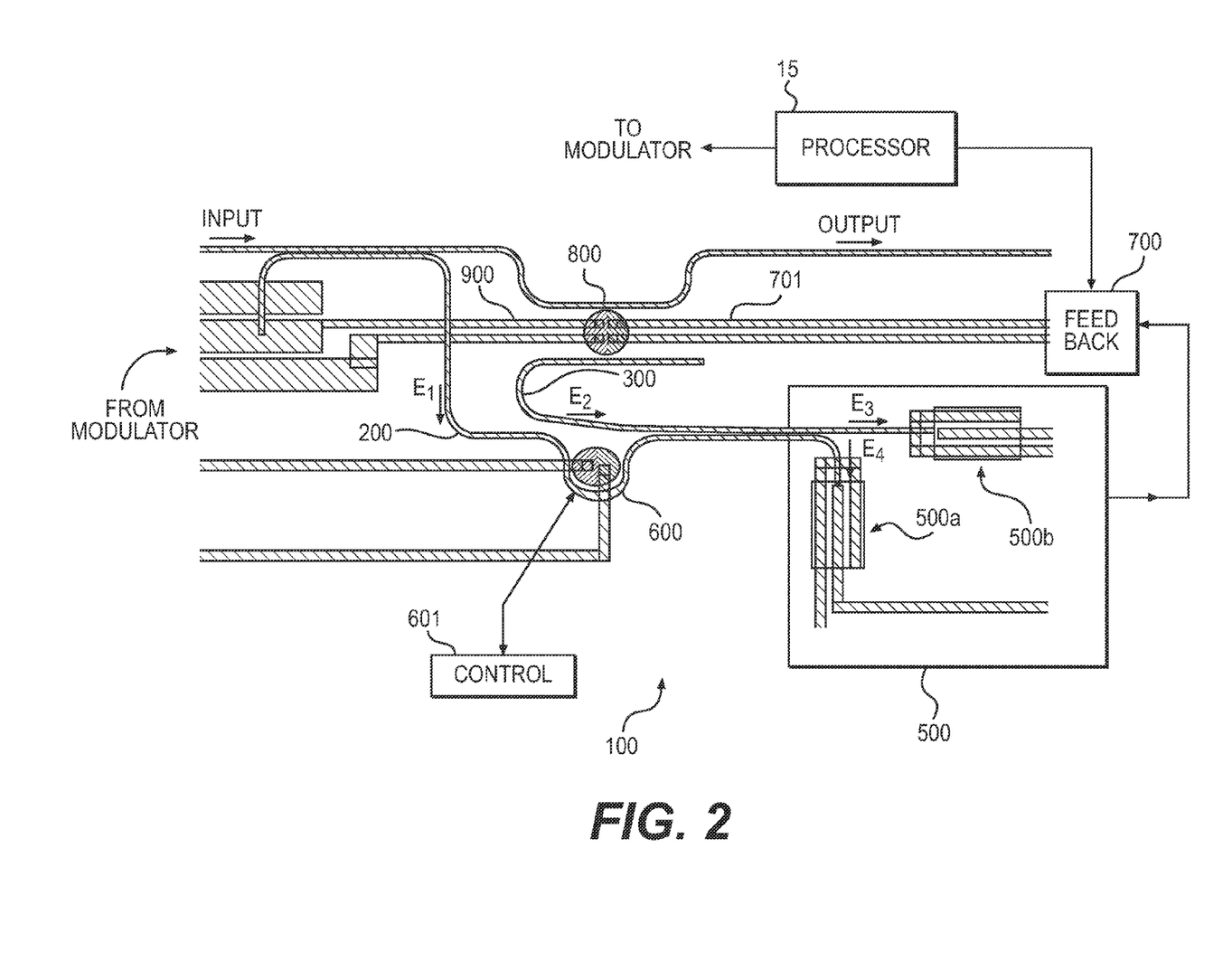
FIG. 2 depicts a system according to an embodiment of the invention.

Referring now to FIG. 2 there is depicted a system 100 according to another embodiment of the invention. Among other things, the embodiment in FIG. 2 shows additional features of the invention related to the adjustment of a micro-resonator in order to control a resonant frequency. The system 100 may include similar components as FIG. 1, such as first and second waveguides 200, 300, a micro-resonator 800, an optional phase shifter 600, and photodetection section 500 comprising detectors 500a, 500b. In addition, system 100 may include modulation leads 900 that may be connected to a modulator (not shown) and tuning leads 701 that may be connected to a feedback section 700.

In order to adjust the frequency of the micro-resonator 800, feedback section 700 may be operable to output an electrical signal to the leads 701. In turn, the leads 701 may be operable, or otherwise configured, to transport the signal to the micro-resonator 800 in order to thermally adjust (e.g., resistively heat) the frequency of the micro-resonator 800. Said another way, in an embodiment of the invention the leads 701 may be configured to make contact with a surface of the micro-resonator 800 (e.g., a portion of lightly doped silicon making up a ring of the micro-resonator). Upon receiving the electrical signal the leads may be operable to generate a temperature gradient. This gradient may be used to change the temperature of the micro-resonator 800 which, in turn, may be used to change the frequency of the micro-resonator 800.

In an embodiment of the invention the leads 701 may comprise metalized silicon or metal film (e.g., aluminum) leads, though other material may be used.

In one embodiment of the invention, when the system 100 operates as a filter the feedback section 700 may be operable to output a tuning signal in order to adjust the frequency of the micro-resonator 800 to substantially equal a desired resonant frequency.

In an alternative embodiment, when the system 100 operates as a modulator the feedback section 700 may be operable to output a tuning signal for adjusting a frequency associated with the micro-resonator 800 to approximate a desired resonant frequency (i.e., set a frequency which may be slightly detuned from perfect resonance).

In an earlier portion of the description above it was mentioned that a phase shifter may be used to adjust at least one of the first or second optical path lengths. In a further embodiment of the invention the phase shifter 600 may be controlled by a connected electronic controller 601. The controller 601 may be operable to determine the optical path-length adjustment needed to reduce the difference in optical phase path lengths to a value that is negligible, modulo $2\pi$ radians, and thereafter forward appropriate control signals to the phase shifter 600. This may be required in order protect the system 100 from the effects of differing path lengths. In an embodiment of the invention the controller 601 may be operable to execute instructions stored in a memory to complete a feedback scan in order to observe the shape and symmetry of a given transfer function. Thereafter, the controller 601 may be operable to compute an electrical signal that may be transported to the shifter 600 in order to adjust the optical lengths of both waveguides 200,300 to be nearly physically identical, and provide effectively identical phase delays. It should be noted that in an embodiment of the invention, the optical path lengths of waveguides 200,300 may be configured to be substantially equal, such that unwanted thermal changes from the environment may impart nearly equal (smaller than $\lambda/10$ at the operating wavelength) changes in optical path length to both waveguides 200,300. Thus, as mentioned previously the phase shifter 600 may be operable to function as a means to provide post-fabrication adjustment of the relative optical phase length(s) between both waveguides 200,300 (due to manufacturing errors, for example). That said, in an additional embodiment, the phase shifter 600 may also be used to equalize (modulo $2\pi$ radians) the phase delay between both waveguides 200,300 should the operating temperature exceed certain limits. This may be completed by again measuring the shape and symmetry of a transfer function by, for example, sweeping the micro-resonator 8 across a range of optical wavelengths, and computing a corresponding electrical adjustment that may be applied by the phase shifter 600, for example.

The adjustment of the optical path lengths of the waveguides 200,300 by the phase shifter 600 and control system 601 may be performed after fabrication of the system, or at regular intervals during operation. Alternatively, an adjustment may be made in response to a signal associated with a temperature change in the system 100, or in response to an increase in the error rate of a modulator. The control system 601 may be operable to control the phase shifter 600 such that the power output to a waveguide 200, 300 may be minimized when the micro-resonator 800 is locked to an optical channel, or such that the error rate of data being filtered or modulated is minimized.

Figure 3:
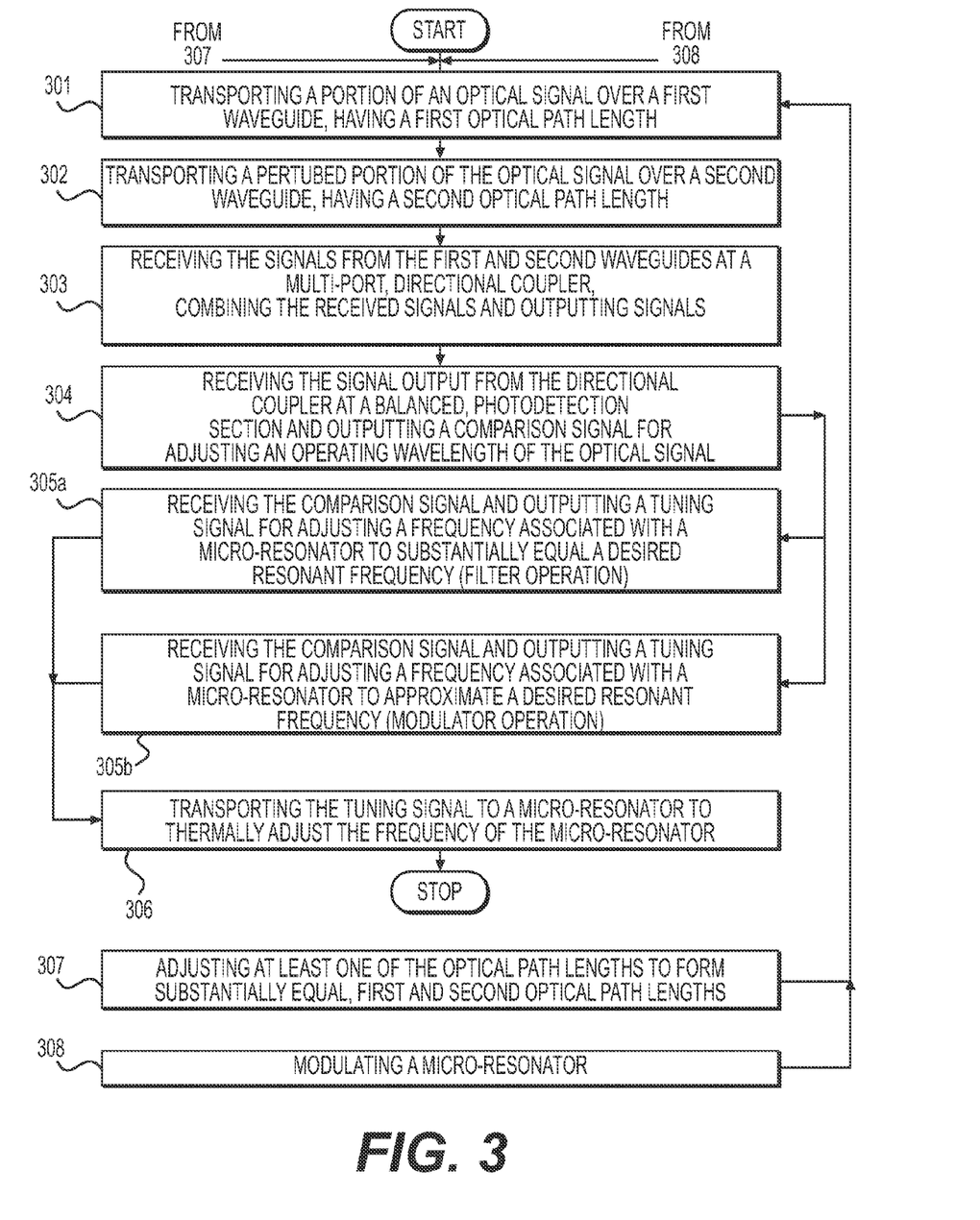
FIG. 3 depicts a flow diagram according to embodiments of the invention.

FIG. 3 depicts a flow diagram illustrating one or more methods in accordance with embodiments of the invention. It should be noted that the flow diagram in FIG. 3 illustrates just a few of the many methods within the scope of the present invention. As shown in FIG. 3, a method for controlling an operating wavelength may comprise transporting a portion of an optical signal over a first waveguide, having a first optical path length in step 301, transporting a perturbed portion of the optical signal over a second waveguide, having a second optical path length in step 302, receiving the signals from the first and second waveguides at a multi-port, directional coupler, combining the received signals, outputting the combined signals in step 303, and receiving the combined signals output from the directional coupler at a balanced, semiconductor photodetection section and outputting a comparison signal (i.e., variable signal) for adjusting an operating wavelength of the optical signal, in step 304. As previously described herein, the directional coupler may comprise a 50%, four-port semiconductor (e.g., silicon-based) directional coupler, the first and second waveguides may comprise semiconductor (e.g., silicon-based) or dielectric waveguides and the photodetection section may comprise Germanium-based photodiodes, for example. In an embodiment of the invention the perturbed portion of the optical signal may be generated using an optical micro-resonator. In an embodiment of the invention, less than 10% of the optical power of the optical signal may be coupled to the first waveguide.

The method may further comprise receiving the comparison signal and outputting a tuning signal (i.e., variable signal) for adjusting a frequency associated with an optical micro-resonator to substantially equal a desired resonant frequency (i.e., filter operation)(in step 305a) or receiving the comparison signal and outputting a tuning signal for adjusting a frequency associated with an optical micro-resonator to approximate a desired resonant frequency (i.e., modulator operation) (in step 305b). In a further embodiment of the invention, a method may comprise transporting the tuning signal to the micro-resonator to thermally adjust the frequency of the micro-resonator, in step 306.

Yet further, a method may optionally include adjusting at least one of the optical path lengths to form substantially equal, first and second optical path lengths, in step 307. Still further, a method may include modulating an optical micro-resonator, in step 308.

Figure 4A:
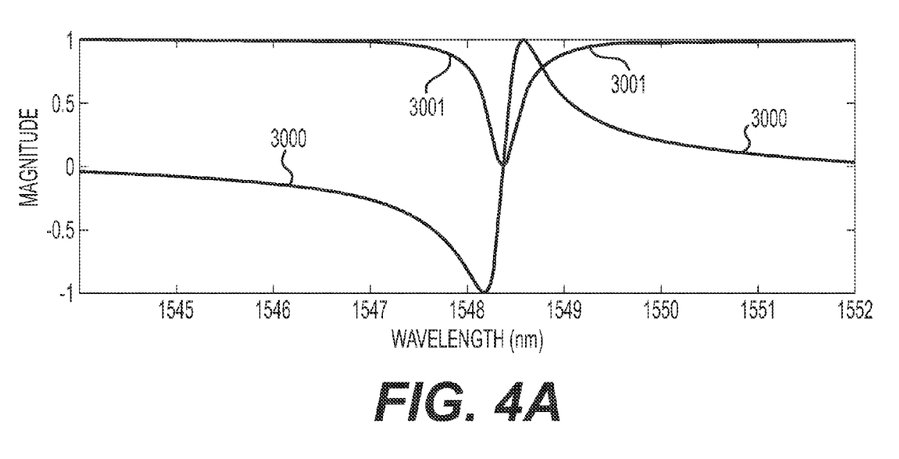
FIGS. 4a and b depict graphical representations of the response of a system, as a function of wavelength shift, according to an embodiment of the invention.
Figure 4B:
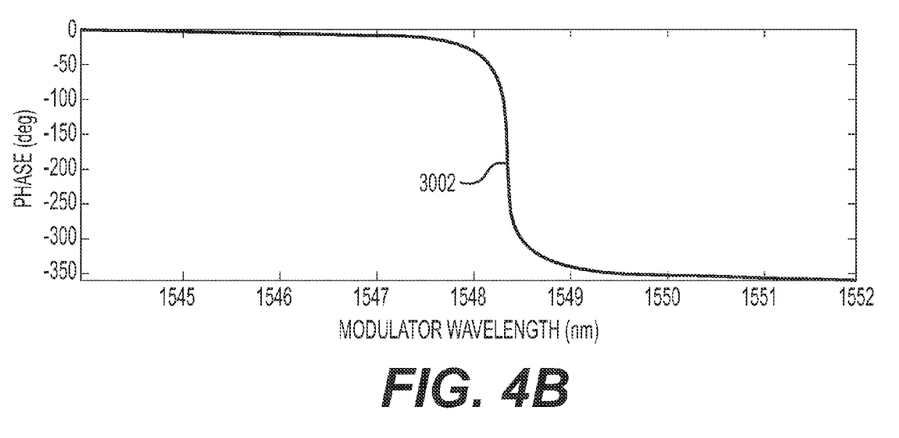

FIGS. 4a and 4b depict graphical representations of the response of a system, such as system 1 in FIG. 1, as a function of wavelength shift, according to an embodiment of the invention. In FIG. 4a, a comparison signal 3000 (may be referred to as an "error" signal by those skilled in the art) may be depicted crossing through zero at an optimal system (micro-resonator) locking point. A through port response signal 3001 is shown as well.

An optimal locking point typically depends on the desired functionality of a given system. For example, the optimal locking point for an amplitude modulator may be less than or greater than a resonant wavelength, at the point of 50% light transmission. In an embodiment of the invention, shifting the locking point may be achieved by adjusting a phase shifter so that the zero crossing of a particular transfer function associated with a micro-resonator no longer corresponds to an ideal resonant frequency (i.e., one slightly detuned from perfect resonance). In FIG. 4b, a corresponding phase shift of a micro-resonator utilizing the tuning signal in FIG. 4a is shown as signal 3002.

While exemplary embodiments have been shown and described herein, it should be understood that variations of the disclosed embodiments may be made without departing from the spirit and scope of the invention. For example, the configuration of the systems described herein may be varied. That said, the scope of the invention should be determined based on the claims that follow.

What is claimed:

1. A system for controlling an operating wavelength comprising:
    a first waveguide, having a first optical path length, configured to transport a portion of an optical signal;
    a second waveguide, having a second optical path length, configured to transport a perturbed portion of the optical signal;
    a multi-port, directional coupler operable to receive the signals from the first and second waveguides, combine the received signals and output combined signals; and
    a balanced, photodetection section operable to receive the combined signals and output a comparison signal for adjusting an operating wavelength of the optical signal.

2. The system as in claim 1 wherein the directional coupler comprises a 50%, four-port semiconductor directional coupler.

3. The system as in claim 2 wherein the directional coupler comprises a silicon-based directional coupler.

4. The system as in claim 1 further comprising a semiconductor phase shifter operable to adjust at least one of the optical path lengths to form substantially equal, first and second optical path lengths.

5. The system as in claim 1 further comprising an optical micro-resonator operable to generate the perturbed portion of the optical signal.

6. The system as in claim 5 wherein the optical micro-resonator comprises one or more circular or ovoid resonators.

7. The system as in claim 1 further comprising a feedback section operable to receive the comparison signal and output a tuning signal for adjusting a frequency associated with an optical micro-resonator to substantially equal a desired resonant frequency.

8. The system as in claim 1 further comprising a feedback section operable to receive the comparison signal and output a tuning signal for adjusting a frequency associated with an optical micro-resonator to approximate a desired resonant frequency.

9. The system as in claim 7 wherein the system further comprises metalized silicon or metal film leads configured to transport the tuning signal to the micro-resonator to thermally adjust the frequency of the micro-resonator.

10. The system as in claim 1 further comprising an additional directional coupler operable to couple the portion of the optical signal to the first waveguide.

11. The system as in claim 10 wherein the additional directional coupler is further operable to couple less than 10% of the optical power of the optical signal to the first waveguide.

12. The system as in claim 1 wherein the first and second waveguides comprise silicon-based waveguides.

13. The system as in claim 1 wherein the first and second waveguides comprise dielectric waveguides.

14. The system as in claim 1 wherein the photodetection section comprises Germanium-based photodiodes.

15. The system as in claim 1 further comprising a modulator operable to modulate an optical micro-resonator.

16. The system as in claim 1 wherein the system comprises a filter.

17. A method for controlling an operating wavelength comprising:
    transporting a portion of an optical signal over a first waveguide, having a first optical path length;
    transporting a perturbed portion of the optical signal over a second waveguide, having a second optical path length;
    receiving the signals from the first and second waveguides at a multi-port, directional coupler, combining the received signals and outputting combined signals; and
    receiving the combined signals output from the directional coupler at a balanced, photodetection section and outputting a comparison signal for adjusting an operating wavelength of the optical signal.

18. The method as in claim 17 wherein the directional coupler comprises a 50%, four-port semiconductor directional coupler.

19. The method as in claim 18 wherein the directional coupler comprises a silicon-based directional coupler.

20. The method as in claim 17 further comprising adjusting at least one of the optical path lengths to form substantially equal, first and second optical path lengths.

21. The method as in claim 17 further comprising generating the perturbed portion of the optical signal using an optical micro-resonator.

22. The method as in claim 17 further comprising receiving the comparison signal and outputting a tuning signal for adjusting a frequency associated with an optical micro-resonator to substantially equal a desired resonant frequency.

23. The method as in claim 17 further comprising receiving the comparison signal and outputting a tuning signal for adjusting a frequency associated with an optical micro-resonator to approximate a desired resonant frequency.

24. The method as in claim 22 further comprising transporting the tuning signal to the micro-resonator to thermally adjust the frequency of the micro-resonator.

25. The method as in claim 17 further comprising coupling less than 10% of the optical power of the optical signal to the first waveguide.

26. The method as in claim 17 wherein the first and second waveguides comprise silicon-based waveguides.

27. The method as in claim 17 wherein the first and second waveguides comprise dielectric waveguides.

28. The method as in claim 17 wherein the photodetection section comprises Germanium-based photodiodes.

29. The method as in claim 17 further comprising modulating an optical micro-resonator.

* * * * *